Sept. 22, 1936.  A. C. ZIMMERMAN ET AL  2,055,226
STUFFING BOX
Filed Sept. 26, 1934
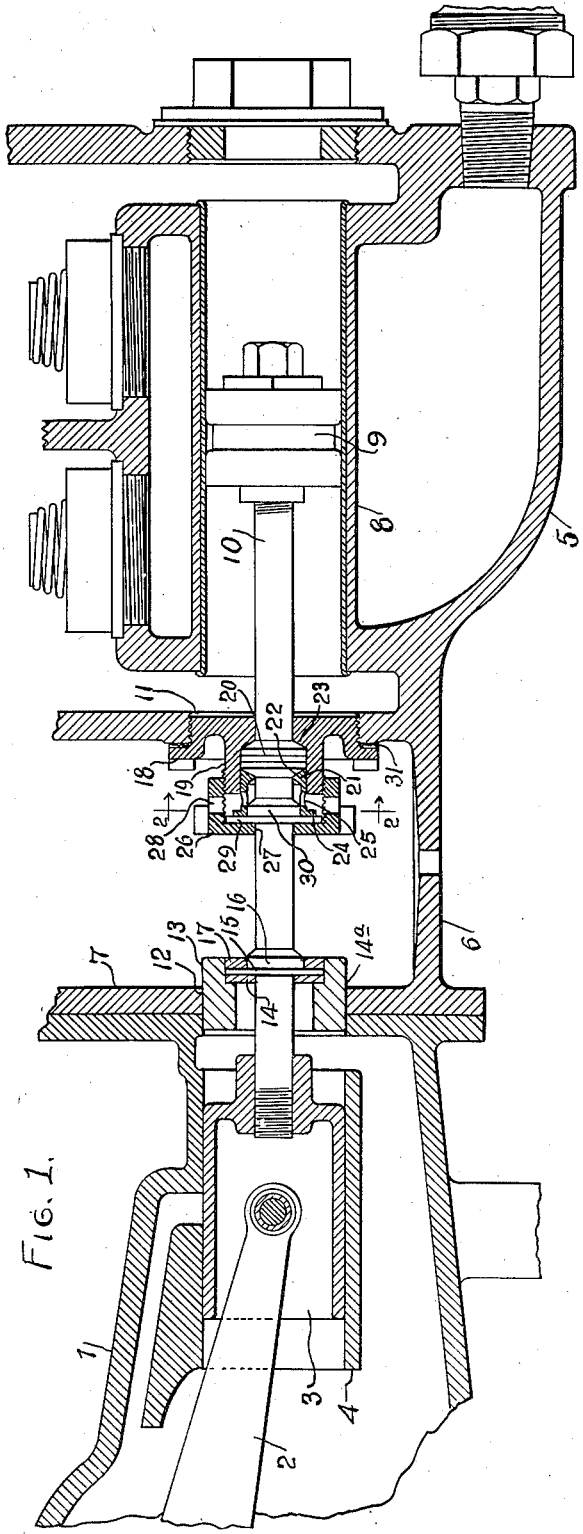
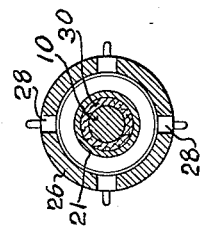
INVENTORS
ARTHUR C. ZIMMERMAN,
ELMER F. STEGER,
BY Toulmin + Toulmin
ATTORNEYS Patented Sept. 22, 1936

2,055,226

UNITED STATES PATENT OFFICE 2,055,226

STUFFING BOX

Arthur C. Zimmerman, and Elmer F. Steger, Dayton, Ohio, assignors to The Duro Company, Dayton, Ohio, a corporation of Ohio Application September 26, 1934, Serial No. 745,614

4 Claims. (Cl. 286—27)

This invention relates to improvements in stuffing boxes, and has for its object to provide a stuffing box in connection with pumps, that will prevent the drain-back of the water; that is, will prevent the water from the pump passing along the pump rod into the crankcase, which is usually filled with oil for lubrication and other purposes.

It is an object of this invention to provide a stuffing box which is constructed as a unit and may be removed for repair and replacement.

These and other objects and advantages will appear from the following description taken in connection with the drawing.

Referring to the drawing:

Figure 1 is a vertical, longitudinal section through a part of a pump and its operating mechanism, showing the application of the present packing and stuffing box structure.

Figure 2 is a section on the line 2—2 of Figure 1.

While the packing or stuffing box structure may be used for various purposes and in various relationships, in the present application it is shown used in connection with a pump and the operating mechanism for the pump.

The numeral 1 is used to designate a part of a crank-casing, in which the numeral 2 represents a pitman connected at one end to a head 3, and guided by means of a guide 4. This head and the supporting guide are cylindrical in shape, but any other suitable form may be used. The pump casing 5 is attached to the crank-casing by means of a connection 6. This connection is attached to a wall 7 of the pump-casing.

In the pump-casing is a pump cylinder 8, which has therein a pump piston 9 adapted to be moved longitudinally within the pump cylinder by means of a pump rod 10, suitably attached at one end to the piston. This rod is attached at its other end to one end of the head 3 so that whenever the head reciprocates the rod and the piston also reciprocate. The part of the pump-casing adjacent the crank-casing is provided with a hole 11, while a similar but smaller hole 12 is provided in the part 7 of the crank-casing. In the hole 12 is a wrought steel sleeve 13, through which the pump rod 10 extends.

One end of this sleeve is enlarged to accommodate washers and a wiper. There are two wrought steel washers 14 and 17, between which there is a leather wiper 15 in the form of a disc, which has in the center thereof an enlarged ring part 16. This part 16 is surrounded by the outer washer 17, while the inner washer 14 fits closely around the pump rod 10. The wrought steel washer 14 rests upon a shoulder 14a provided therefor in the sleeve, while the other washer 17 is substantially flush with the end of the sleeve. Any suitable means may be provided for holding the washers and the wiper assembled in the sleeve.

The hole 11 is closed by means of a disc 18 threaded therein. This disc has projecting therefrom, toward the crank-casing, an integral sleeve 19, which has therein adjacent the disc a ring packing 20, which closely fits around the pump rod 10 and is held in position by means of a gland 21, the inner end of which is beveled at 22 to engage a correspondingly shaped part of the ring packing. The disc 18 is provided with a hole for the pump rod 10, and has around this hole a beveled part 23 opposite the beveled part 22 of the gland. These two beveled parts serve as cooperating seats for holding the ring packings in position around the pump rod.

The outer end of the gland 21 is outwardly flared and has an outwardly extending flange 24, and has adjacent the flange a plurality of holes 25 through which any water trapped about the pump rod and in the gland may escape. The free end of the sleeve 19 is closed by means of a cap 26, which has a hole 27 therein for the pump rod 10. This cap has a plurality of holes 28, corresponding to the holes 25, through which the water may pass.

Between the outer end of the gland and the inner surface of the cap 26 is a leather disc wiper 29, which has an inwardly projecting ring part 30 within the flanged and flared end of the gland 21. The part of the connection 6 immediately below the cap 26 serves as a water box to catch the water that has dripped through the holes 25 and 28. Between the disc 18 and the adjacent part of the pump-casing is a gasket 31 which prevents water passing between the disc and the pump-casing.

With the foregoing features it is practically impossible for water to escape from the pump-casing and get into the crank-casing. Should any water pass the ring packing it will be drained through the various holes into the water box. Any remaining water on the pump rod would find difficulty in passing the leather disc 29 and the ring 30. If any water should pass the leather disc 29 and the ring 30, the wiper 15 and the part 16 would serve to trap and divert this water so it would be impossible for water to escape from the pump-casing and get into the crank-casing.

It will be understood that we desire to comprehend within our invention such modifications as come within the scope of the claims and the invention.

Having thus fully described the invention, what we claim as new and desire to secure by Letters Patent, is:

1. In a packing and wiping attachment in combination with a casing having a threaded hole therein, a disc member adapted to be threaded into said hole, said disc having a hole therein to receive a pump shaft, a sleeve integral with the disc around the hole, a packing in said sleeve around the hole, a gland member in the sleeve in engagement at one end with the packing, a flange on the other end of the gland member, a leather wiper against the flange having a ring part projecting into the gland member, and a cap threaded on the sleeve and pressing the wiper against the flange.

2. In a packing and wiping attachment in combination with a casing having a threaded hole therein, a disc member adapted to be threaded into said hole, said disc having a hole therein to receive a pump shaft, a sleeve integral with the disc around the hole, a packing in said sleeve around the hole, a gland member in the sleeve in engagement at one end with the packing, a flange on the other end of the gland member, a leather wiper against the flange having a ring part projecting into the gland member, and a cap threaded on the sleeve and pressing the wiper against the flange, the parts engaging the packing being so shaped that they tend to force the packing against a shaft in the hole.

3. In a packing and wiping attachment, a disc having therein a pump rod hole and an integral sleeve around the hole on one side of the disc, a packing in the sleeve around the hole, a gland member in the sleeve engaging at one end the packing, a wiper on the other end of the gland member, said wiper having a ring part projecting into the gland, and a cap member threaded onto the sleeve and engaging the wiper.

4. In a packing and wiping attachment, a disc having therein a pump rod hole and an integral sleeve around the hole on one side of the disc, a packing in the sleeve around the hole, a gland member in the sleeve engaging at one end the packing, a wiper on the other end of the gland member, said wiper having a ring part projecting into the gland, and a cap member threaded onto the sleeve and engaging the wiper, said cap and gland having holes for the escape of water collected between the packing and the wiper.

ARTHUR C. ZIMMERMAN.
ELMER F. STEGER.